United States Patent
Ohlarik et al.

(10) Patent No.: US 10,477,511 B2
(45) Date of Patent: Nov. 12, 2019

(54) MOBILE DEVICE MAPPING FOR WIRELESS ACCESS POINT CONNECTION MANAGEMENT AND DEVICE AUTOMATION

(71) Applicant: Verizon Patent and Licensing Inc., Arlington, VA (US)

(72) Inventors: Derek Wade Ohlarik, Flemington, NJ (US); Mauricio Pati Caldeira de Andrada, South Plainfield, NJ (US); Taussif Khan, Martinsville, NJ (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 21 days.

(21) Appl. No.: 15/875,012

(22) Filed: Jan. 19, 2018

(65) Prior Publication Data

US 2019/0230620 A1 Jul. 25, 2019

(51) Int. Cl.
*H04W 64/00* (2009.01)
*H04W 24/10* (2009.01)
*H04W 48/20* (2009.01)
*H04W 4/02* (2018.01)
*H04W 4/33* (2018.01)
*H04W 4/029* (2018.01)
*H04W 88/12* (2009.01)
*H04W 84/12* (2009.01)
*H04W 92/12* (2009.01)

(52) U.S. Cl.
CPC ......... *H04W 64/006* (2013.01); *H04W 4/027* (2013.01); *H04W 4/029* (2018.02); *H04W 4/33* (2018.02); *H04W 24/10* (2013.01); *H04W 48/20* (2013.01); *H04W 84/12* (2013.01); *H04W 88/12* (2013.01); *H04W 92/12* (2013.01)

(58) Field of Classification Search
CPC ..... H04W 64/00; H04W 4/026; H04W 36/32; H04W 4/02; H04W 36/08; H04W 4/80; G01S 5/0252; G01S 5/0263; G01S 19/48; G01C 21/165; G01C 21/206; G01C 21/12
See application file for complete search history.

(56) References Cited

U.S. PATENT DOCUMENTS

2010/0008337 A1* 1/2010 Bajko ............... H04W 64/00 370/338
2012/0105202 A1* 5/2012 Gits ................. G01C 21/206 340/8.1

(Continued)

*Primary Examiner* — Jung Liu

(57) ABSTRACT

A system may determine, using first location data, that a client device is located in an interior of a premises in which multiple wireless network access points (APs) are deployed in a wireless network; identify, using second location data, locations of the client device within the interior; obtain, for the locations, a dataset including wireless network signal strength values corresponding to signal coverage areas associated with the wireless network APs; generate, using the dataset, a wireless network mapping corresponding to a layout of the interior; evaluate, against connectivity rules, the wireless network mapping with respect to overlapping signal coverage areas, the connectivity rules defining operations for connecting the client device to the wireless network as a function of the locations; and apply at least one of the operations to the client device at a current location relative to a preceding location and/or a succeeding location of the client device.

20 Claims, 8 Drawing Sheets

(56) References Cited

U.S. PATENT DOCUMENTS

| | | | |
|---|---|---|---|
| 2013/0109413 A1* | 5/2013 | Das | H04W 4/04 |
| | | | 455/456.6 |
| 2013/0142059 A1* | 6/2013 | Di Girolamo | H04L 12/66 |
| | | | 370/252 |
| 2013/0165142 A1* | 6/2013 | Huang | H04W 64/003 |
| | | | 455/456.1 |
| 2014/0335893 A1* | 11/2014 | Ronen | G01S 5/0252 |
| | | | 455/456.1 |
| 2015/0005014 A1* | 1/2015 | Huang | G01S 5/0263 |
| | | | 455/456.5 |
| 2015/0097731 A1* | 4/2015 | Russell | G01S 19/48 |
| | | | 342/450 |
| 2015/0098442 A1* | 4/2015 | Shatsky | G01C 21/165 |
| | | | 370/331 |

* cited by examiner

MOBILE DEVICE MAPPING FOR WIRELESS ACCESS POINT CONNECTION MANAGEMENT AND DEVICE AUTOMATION

BACKGROUND

Wireless local area networks (WLANs) offer convenient access to networking resources, particularly for environments in which use of mobile client devices, such as cell phones, tablets, and/or laptop computers, is prevalent. In private dwellings and/or public facilities where device users can move from room-to-room, floor-to-floor, and/or store-to-store, wireless networking permits convenient and easily scalable connectivity to an intranet(s) and/or the Internet. WLANs also permit client devices to communicate with (and users to control) various networked appliances, such as, mechanized window coverings, security systems, artificial lighting, smart assistants, and/or heating, ventilation and air conditioning (HVAC) equipment, which affect the immediate area in these settings.

The process for configuring client devices in the interior of large houses, multi-story office buildings, retail centers, etc., that deploy multiple wireless network access points (APs) involves connection management (e.g., handover, etc.) in areas of overlapping wireless network (e.g., WiFi) signal coverage. Such processes often entail dynamic reconfiguration of client devices responsive to movement of the user (and the client device) relative to the wireless network APs and/or smart appliances (e.g., Internet of things (IoT) devices, etc.) serving the different areas within such a facility. Thus, client device location information that is more precise than that provided by current device-locating techniques (e.g., global positioning system (GPS)) in structural interiors would be beneficial in maintaining optimal wireless throughput and connection stability for applications such as voice over IP (VoIP) calling using a WLAN.

DETAILED DESCRIPTION OF PREFERRED EMBODIMENTS

Figure 1:
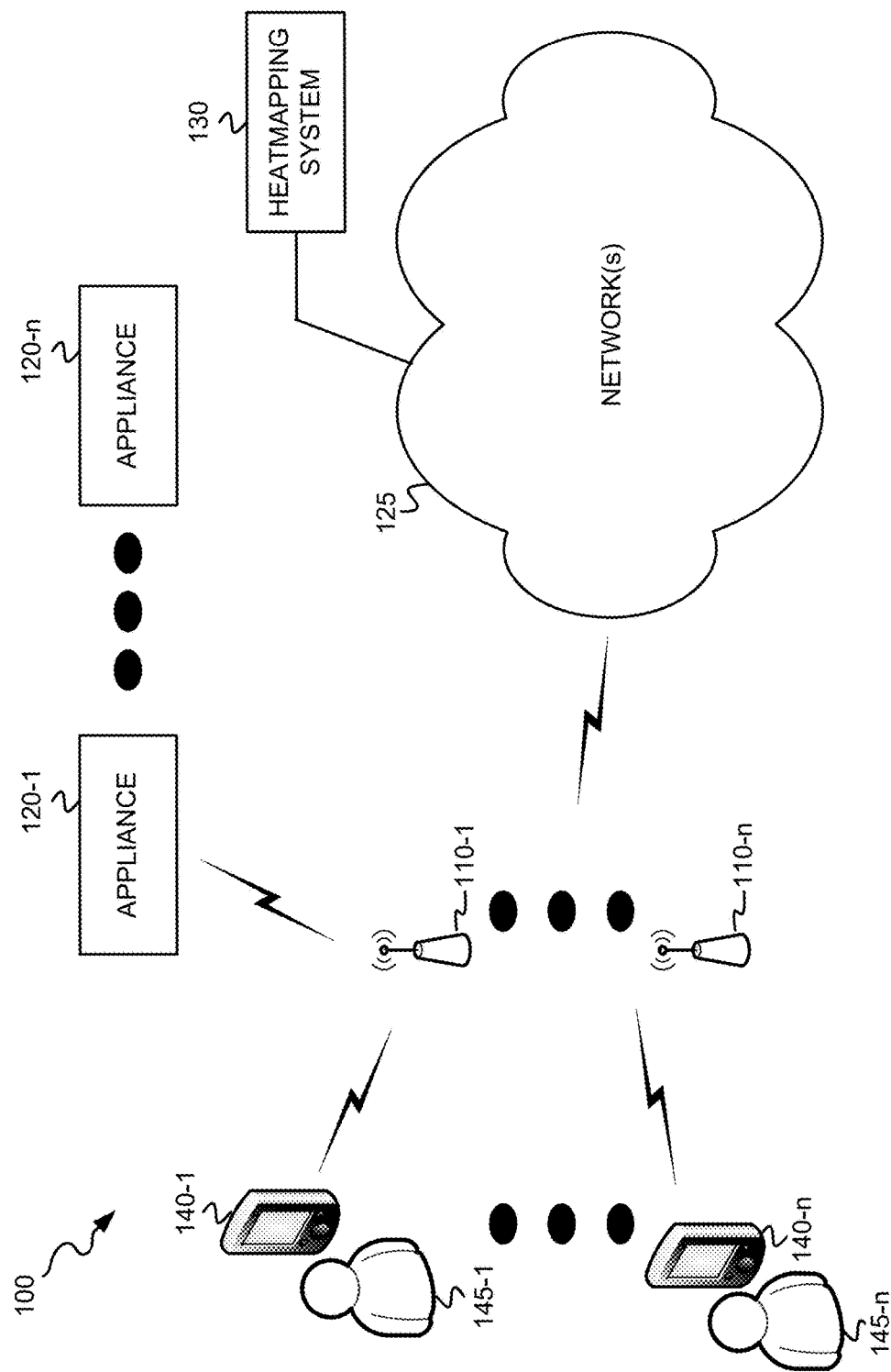
FIG. 1 is a diagram illustrating an exemplary environment consistent with an embodiment of wireless network heatmapping.

The following detailed description refers to the accompanying drawings. The same reference numbers in different drawings may identify the same or similar elements.

Whereas physical access to a local area network (LAN) is determined by the location of network ports (e.g., RG-45 sockets), physical access to a wireless LAN (e.g., WLAN) is determined by the deployment of one or more wireless access points (WAPs) at a given site, and may be affected by factors such as signal characteristics and structural properties (e.g., signal strength, interference, attenuation, etc.). Thus, a WAP's connectivity coverage for a WLAN may extend to, for instance, areas separated by walls defining adjacent rooms or multiple stories, depending upon, for example, the configuration of the WAPs and/or the construction materials used in the walls/floors. For proximate or adjacent areas in which WLAN access is arbitrated among the available WAPs, systems and methods described herein may use WLAN signal strengths to "heatmap" the positions of client devices within a building or other structure.

In an embodiment, signal strengths may be obtained at positions within coverage areas associated with a WLAN where a client device is located, and heatmapping data generated with respect to WAP sites based upon the identified signal strengths. The client device's proximity to the WLAN coverage areas may be determined by ascertaining the position of the client device using an identified reference point for the premises and tracking the relative movement of the client device within the premises. Two or more coverage areas may overlap such that multiple WAPs are available at a number of positions to the client device for connecting to the WLAN. Based upon the identified coverage areas, heatmaps corresponding to a floor layout of the premises may be generated and provided to the client device. The heatmaps may be used in making connection management decisions in lieu of existing connection management rules, thus optimizing location-based access to available WLAN resources. Additionally, or alternatively, the heatmaps may be used in triggering premises automation systems (e.g., smart devices) according to customized control settings corresponding to preferences of a client device user.

As used herein, a "coverage area" may include a dynamic area within a WLAN that may be used to assign logical networks for connecting to client devices. Coverage areas may be defined, for example, based on position data describing the locations of relative signal strength associated with a WAP. A coverage area may be delineated by physical boundaries, such as, for example, the walls of a room. In other embodiments, coverage areas may have effective perimeters that do not correspond to physical boundaries.

As used herein, a "heatmap" may include a data construct that provides information relating to coverage areas that, when applied to a client device, establish access to network resources at specified positions within the interior of a structure, consistent with a floorplan or layout of the premises. Heatmaps may define locations, for example, to control network appliances, allow access to local and/or wide area network servers, permit interaction with cloud resources, and/or receive information from network appliances (e.g., Internet of Things (IoT) devices). Heatmaps may be associated with one or more coverage areas, and thus may provide the ability for client devices to trigger network appliances without having to be manually configured by the user as the user moves about the premises. Thus, upon leaving/entering a coverage area, the client device may be automatically configured using the heatmap for controlling network appliances within each coverage area and/or automatically performing connection management (e.g., handover) between WAP sites.

Unlike conventional approaches, use of the heatmap can make it unnecessary for the network appliances to detect a person's presence using one or more sensors associated with the network appliances. Advantageously, customized settings for the user—as opposed to other persons present in an area—can be applied to the network appliances. Intelligent wireless network connection management described herein may use the heatmap to anticipate the user's upcoming movements for determining connectivity management operations, whether the signal strength of the connected WAP is stronger or weaker than the signal strength of a WAP sourcing a neighboring coverage area, which may run counter to traditional rules for WiFi connectivity management.

In one embodiment the heatmap may be in the form of a schematic and/or other graphical representation of the premises. For example, high signal strength may correspond to heatmap regions shaded in red/orange colors, while low signal strength may correspond to heatmap regions that are shaded in blue/green colors as displayed, for instance, via a graphical user interface (GUI). In other embodiments the heatmap may be in the form of any number of data structures.

Figure 2:
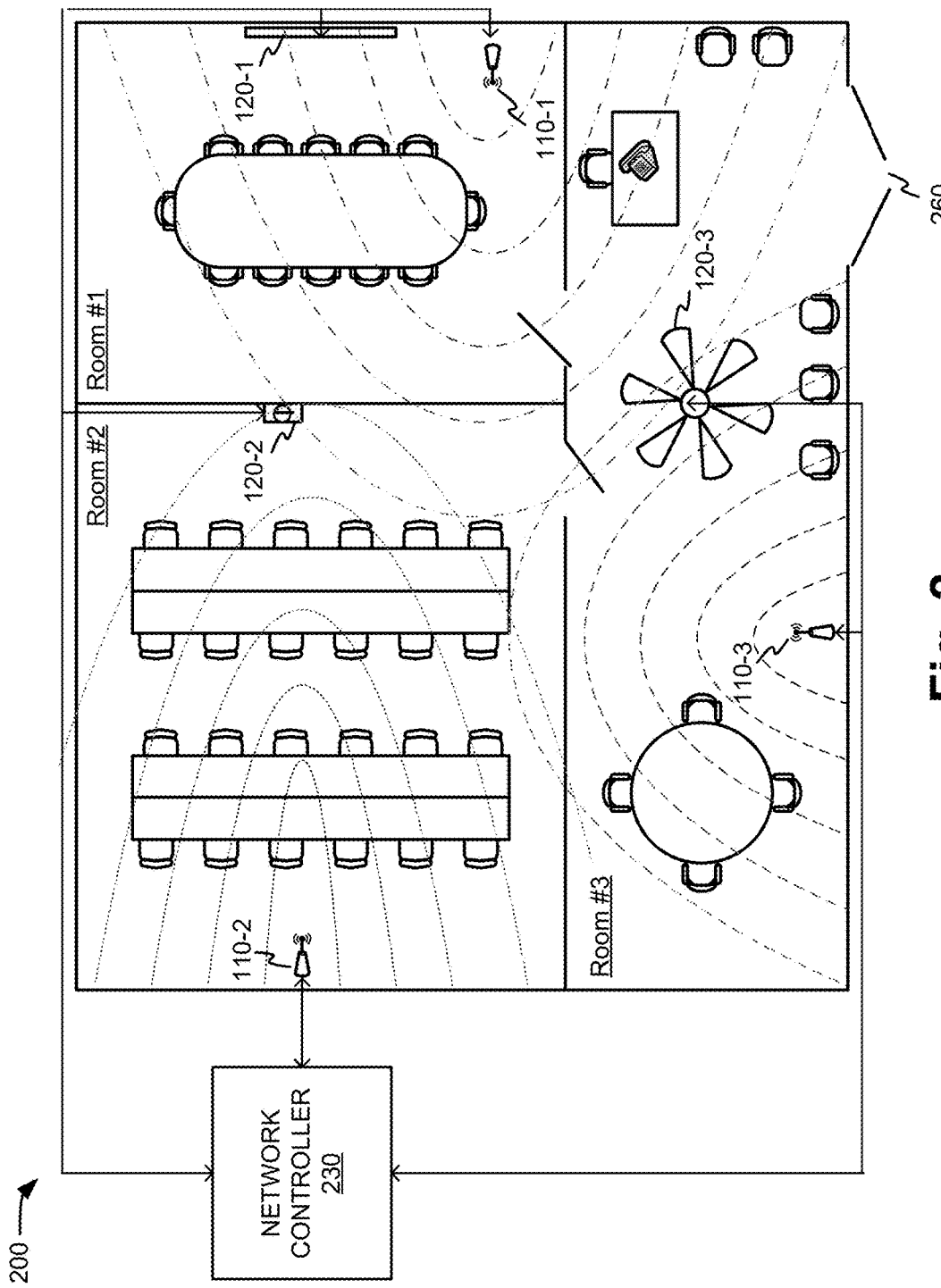
FIG. 2 is a diagram illustrating an exemplary network consistent with an embodiment of wireless network heatmapping.

FIG. 1 illustrates an exemplary environment 100 including a heatmapping system 130 communicatively connected to a plurality of client devices 140-1 through 140-n (collectively "client devices 140") associated with users 145-1 through 145-n, via network 125 and wireless access points (WAPs) 110-1 through 110-n (collectively "WAPs 110") associated with a WLAN. Client devices 140 may also be communicatively connected to a plurality of smart appliances 120-1 through 120-n (collectively "appliances 120") via WAPs 110, for example, using a network controller 230 (FIG. 2).

Heatmapping system 130 may include a server, computing device, etc., associated with a service provider and/or any other network device that is configured to communicate over network 125 to client devices 140, via WAPs 110, using any communication platforms and technologies suitable for transporting data and/or communication signals, including known communication technologies, devices, media, and protocols supportive of remote data communications, examples of which include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Evolution Data Optimized Protocol ("EVDO"), Time Division Multiple Access ("TDMA") technologies, Short Message Service ("SMS"), Multimedia Message Service ("MMS"), radio frequency ("RF") signaling technologies, wireless communication technologies (e.g., Bluetooth®, Wi-Fi, etc.), in-band and out-of-band signaling technologies, and other suitable communications networks and technologies.

Network 125 may include one or more networks, including, but not limited to, wireless networks, mobile telephone networks (e.g., cellular telephone networks), closed media networks, open media networks, closed communication networks, open communication networks, satellite networks, navigation networks, broadband networks, narrowband networks, voice communications networks (e.g., VoIP networks), the Internet, wide area networks, local area networks (LANs), public networks, private networks, and any other networks capable of carrying data and/or communications signals between client devices 140 and heatmapping system 130. In certain exemplary embodiments, network 125 includes a mobile telephone network, and heatmapping system 130 and client devices 140 are configured to communicate with one another using mobile phone communication technologies.

In some examples, environment 100 may include any computer hardware and/or instructions (e.g., software programs), or combinations of software and hardware, configured to perform the processes described herein. In particular, it should be understood that components of environment 100 may be implemented on one physical computing device or may be implemented on more than one physical computing device. Accordingly, environment 100 may include any one of a number of computing devices and/or computer operating systems (e.g., mobile device operating systems).

Accordingly, the processes described herein may be implemented at least in part as computer-executable instructions, i.e., instructions executable by one or more computing devices, tangibly embodied in a computer-readable medium. In general, a processor (e.g., a microprocessor) receives instructions, e.g., from a memory, a computer-readable medium, etc., and executes those instructions, thereby performing one or more processes, including one or more of the processes described herein. Such instructions may be stored and transmitted using a variety of known computer-readable media.

A computer-readable medium (also referred to as a processor-readable medium) includes any medium that participates in providing data (e.g., instructions) that may be read by a computer (e.g., by a processor of a computer). Such a medium may take many forms, including, but not limited to, non-volatile media, volatile media, and transmission media. Non-volatile media may include, for example, optical or magnetic disks and other persistent memory. Volatile media may include, for example, dynamic random access memory ("DRAM"), which typically constitutes a main memory. Transmission media may include, for example, coaxial cables, copper wire and fiber optics, including the wires that comprise a system bus coupled to a processor of a computer. Transmission media may include or convey acoustic waves, light waves, and electromagnetic emissions, such as those generated during radio frequency ("RF") and infrared ("IR") data communications. Common forms of computer-readable media include, for example, a floppy disk, a flexible disk, hard disk, magnetic tape, any other magnetic medium, a CD-ROM, DVD, any other optical medium, punch cards, paper tape, any other non-transitory physical medium with patterns of holes, a RAM, a PROM, an EPROM, a FLASH-EEPROM, any other memory chip or cartridge, or any other medium from which a computer can read.

Client devices 140 may be associated with users 145, which in certain embodiments may be subscribers to or users of one or more services (e.g., a wireless telephone service and/or a heatmapping service) provided via network 125. As an example, FIG. 1 shows users 145 as being associated with client devices 140 for illustrative purposes. Other user 145 associations with client devices 140 may be defined in environment 100.

Client device 140 may include any device configured to perform one or more of the client device operations described herein, including communicating with heatmapping system 130 by way of network 125. Client device 140 may include, but is not limited to, a wireless computing device, a wireless communication device (e.g., a mobile telephone configured to access one or more services provided over network 125), a portable computing device (e.g., a laptop computer), a portable communication device, a personal digital assistant, a vehicular computing and/or communication device, a vehicle (e.g., an automobile), a portable navigation device, a Global Positioning System ("GPS") device, and/or any other mobile device configured to perform one or more of the mobile device operations described herein.

Appliance 120 may be any device which can access a network using a wireless and/or a wired connection. Appliance 120 may send and/or receive data from client device 140, and in some embodiments, may serve as an output device, an input device, both, or neither. One example of an output device may be a light fixture which can be used to illuminate a particular area in a room. An example of an input device may be a networked camera, which can obtain a video feed of a particular area for surveillance. Some devices, such as a smart assistant, may serve as both an input and output device for client device 140. Other network appliances 120 may interact with client device 140, but may not be classified as input/output (I/O) devices. For example, in an exemplary environment 100, a thermostat may include a network interface where it may receive commands from client device 140 for control, or send status messages to client device 140 regarding state information, such as temperature in a room.

FIG. 2 is a diagram illustrating exemplary WLAN 200 consistent with embodiments described herein. WLAN 200 may include, for example, premises 260 (e.g., an office suite) for which a plan view of the floor layout is shown. Premises 260 depicts a floor plan having separate rooms serving different purposes, each of which may be serviced by one or more (and possibly overlapping) coverage areas. Exemplary coverage areas may be sourced by WAPs 110-1, 110-2, and 110-3, respectively, and provide access to appliances 120-1, 120-2, and 120-3, respectively. A network controller 230 may have wired connections to WAPs 110 and/or appliances 120. However, other embodiments may include a wireless channel to network controller 230 with one or more WAPs 110 and/or appliances 120. WLAN 200 is shown as having signal coverage areas represented by broken lines that emanate from each source (i.e., WAP 110-1, 110-2, 110-3) which generally decrease in signal strength based on a distance from the source and based on the degree of shielding provided by walls and other obstructions. It will be appreciated that the coverage areas may propagate from their sources in directions and/or signal propagation patterns other than what is shown, and further that signal directionality, intensity, etc., for a given source may vary as a function of time.

Further referring to FIG. 2, a first coverage area may extend to all or a portion of Room #1, e.g., a conference room, and be sourced by WAP 110-1, and provide access to network appliance 120-1. Network appliance 120-1 may be a motorized window covering (e.g., shade, blind, etc.). A second coverage area may extend to all or a portion of Room #2, e.g., a common workspace, and be sourced by WAP 110-2, and provide access to network appliance 120-2. Network appliance 120-2 may be a programmable thermostat that controls HVAC that supplies Room #2 (and possibly Room #1 and/or Room #3). The thermostat may receive commands provided by user 145 of client device 140. A third coverage area may extend to all or a portion of Room #3, e.g., a lobby and common area adjoining Room #1 and Room #2, and be sourced by WAP 110-3 and provide access to network appliance 120-3. Network appliance 120-3 may be a ceiling fan in the lobby area. In one embodiment, any of the first coverage area, the second coverage area, and/or the third coverage area may be present to varying degrees (e.g., signal intensity) in regions of one or more of Room #1, Room #2, and/or Room #3. As shown, two or three of the coverage areas may overlap (as indicated by the overlapping broken lines), i.e., provide access to WLAN 200 in premises 260 to client device 140 at a single position (e.g., in Room #2).

Network controller 230 may use position information for client device 140 within premises 260 to selectively provide access to WAPs 110-1, 110-2, 110-3, and/or selectively communicate with and/or network appliance 110-1, 110-2, 110-3, respectively. As will be described in more detail with respect to FIG. 5, network controller 230 may determine a client device 140's position using the infrastructure of WLAN 200 as identified by a heatmap. Additionally, the positions of client device 140 may be determined by client device 140 itself using the heatmap, which then may be passed to network controller 230 for further processing. The positions received from client device 140 may be used instead of positions derived by network controller 230, or the received positions may be used in combination with the controller-derived positions to improve location accuracy.

Figure 3:
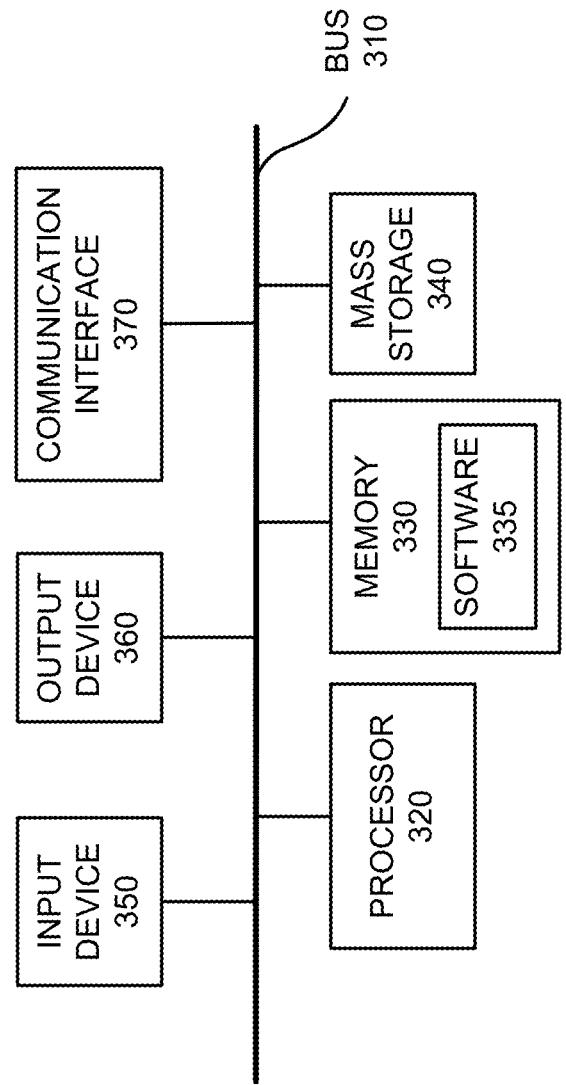
FIG. 3 is a block diagram showing exemplary components of a network controller.

FIG. 3 is a block diagram showing exemplary components of client device 140 and/or network controller 230. Client device 140 and/or network controller 230 may include a bus 310, a processor 320, a memory 330, software 335, mass storage 340, an input device 350, an output device 360, and a communication interface 370. Other devices operating in environment 100, such as WAP 110, appliance 120, and/or heatmapping system 130, may be configured in a similar manner.

Bus 310 includes a path that permits communication among the components of heatmapping system 130 and/or network controller 230. Processor 320 may include any type of single-core processor, multi-core processor, microprocessor, latch-based processor, and/or processing logic (or families of processors, microprocessors, and/or processing logics) that interprets and executes instructions. In other embodiments, processor 320 may include an application-specific integrated circuit (ASIC), a field-programmable gate array (FPGA), and/or another type of integrated circuit or processing logic. For example, the processor 320 may be an x86 based CPU, and may use any operating system, which may include varieties of the Windows, UNIX, and/or Linux. Processor 320 may also use high-level analysis software packages and/or custom software written in any programming and/or scripting languages for interacting with other network entities that are communicatively coupled to WLAN 200 and/or network 125.

Memory 330 may include any type of dynamic storage device that may store information and/or instructions, for execution by processor 320, and/or any type of non-volatile storage device that may store information for use by processor 320. For example, memory 330 may include a RAM or another type of dynamic storage device, a ROM device or another type of static storage device, and/or a removable form of memory, such as a flash memory. Mass storage device 340 may include any type of on-board device suitable for storing large amounts of data, and may include one or more hard drives, solid state drives, and/or various types of RAID (redundant array of independent discs) devices.

Software 335 may include an application or a program that provides a function and/or a process. As an example, with reference to heatmapping system 130 and/or client device 140, software 335 may include an application that, when executed by processor 320, provides the functions of wireless network heatmapping, as described herein. Also, software 335 may include an application that, when executed by processor 320, provides the functions related to wireless network connection management and/or triggering premises automation devices, as described herein. For example, processor 320 may use location information for client device 140 from a heatmap to perform handover between WAPs 110 and/or to activate/deactivate network appliances 120 proximate to client device 140. Software 335 may also include firmware, middleware, microcode, hardware description language (HDL), and/or other form of instruction. Software 335 may further include an operating system.

Input device 350 may allow an operator to input information into client device 140 and/or network controller 230, where appropriate. Input device 350 may include, for example, a keyboard, a mouse, a pen, a microphone, a remote control, an audio capture device, an image and/or video capture device, a touch-screen display, and/or another type of input device. In some embodiments, network controller 230 may be managed remotely and may not include input device 350. Output device 360 may output information to an operator of client device 140 and/or network controller 230. Output device 360 may include a display (such as an LCD), a printer, a speaker, and/or another type of output device. In some embodiments, network controller 230 may be managed remotely and may not include output device 360.

Communication interface 370 may include a transceiver that enables client device 140 and/or network controller 230 to communicate (both wired and/or wirelessly) within WLAN 200 and access external resources over network 125, such as, for example, the Internet. Specifically, communication interface 370 may be configured for wireless communications (e.g., Radio Frequency (RF), infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 370 may include a transmitter that converts baseband signals to RF signals and/or a receiver that converts RF signals to baseband signals. Communication interface 370 may be coupled to one or more antennas for transmitting and receiving RF signals. Communication interface 370 may include a logical component that includes input and/or output ports, input and/or output systems, and/or other input and output components that facilitate the transmission/reception of data to/from other devices. For example, communication interface 370 may include a network interface card (e.g., Ethernet card) for wired communications and/or a wireless network interface (e.g., a WiFi) card for wireless communications. Communication interface 370 may also include a Universal Serial Bus (USB) port for communications over a cable, a Bluetooth® wireless interface, a Radio Frequency Identification (RFID) interface, a Near Field Communication (NFC) wireless interface, and/or any other type of interface that converts data from one form to another form.

As described below, heatmapping system 130 may perform certain operations relating to heatmapping WLAN 200. Client device 140 and/or heatmapping system 130 may perform one or more operations in response to processor 320 executing software instructions contained in a computer-readable medium, such as memory 330 and/or mass storage 340. The software instructions may be read into memory 330 from another computer-readable medium or from another device. The software instructions contained in memory 330 may cause processor 320 to perform processes described herein. Alternatively, hardwired circuitry may be used in place of, or in combination with, software instructions to implement processes described herein. Thus, implementations described herein are not limited to any specific combination of hardware circuitry and software.

Although FIG. 3 shows exemplary components of client device 140 and/or network controller 230, in other implementations, client device 140 and/or network controller 230 may include fewer components, different components, additional components, or differently arranged components than depicted in FIG. 3.

Figure 4:
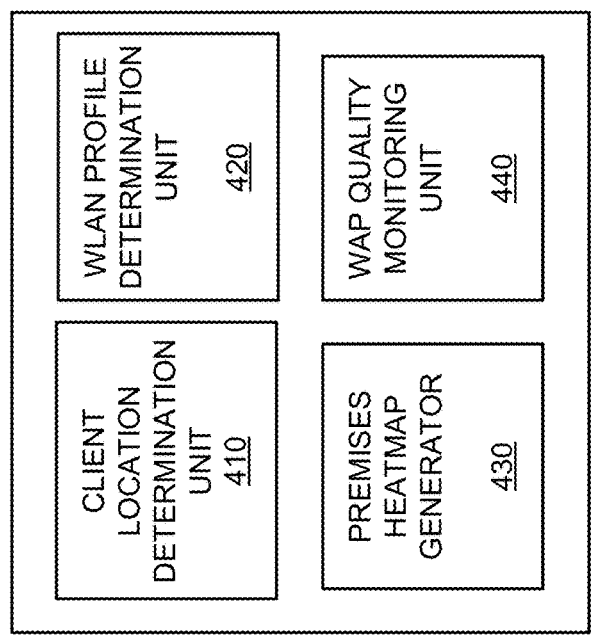
FIG. 4 is a block diagram of exemplary functional components of a network device.

FIG. 4 is a block diagram of exemplary functional components 400 of client device 140 and/or heatmapping system 130, which may include a client location determination unit 410, a WLAN profile determination unit 420, a premises heatmap generator 430, and a WAP quality monitoring unit 440. Functional components 400 may be implemented as hardware, computing instructions (e.g., software 335) executed by a processor (e.g., processor 320), which are tangibly embodied on a computer-readable medium, or a combination thereof configured to perform one or more of the processes described herein. In certain embodiments, functional components 400 may be implemented as a software application embodied on software 335 and/or a non-transitory computer-readable medium, such as memory 330 and/or mass storage device 340, configured to direct processor 320 to execute one or more of the processes described herein.

Client location determination unit 410 may be configured to determine the location of client device 140. In one embodiment, client location determination unit 410 may have a position determination capability based on, for example, the ability of a receiver to receive and process GPS signals at client device 140. In one embodiment, the GPS data may be used to geo-reference premises 260, for example with a physical address, geographic coordinate system, etc. In some embodiments, the location information may also identify a floor level in a multi-story building containing premises 260, and may distinguish premises 260 from one or more other suites sharing the identified floor level. Client location determination unit 410 may determine that client device 140 has entered premises 260 when the GPS signals received at client device 140 are no longer sufficient to accurately locate client device 140, and the last accurate GPS signals correspond to premises 260. In some embodiments, client location determination unit 410 may detect a signal from one or more GPS satellites near a window, for example, which may be insufficient to fix the location of client device 140, but may sufficient to identify a direction (e.g., north (N), south (S), east (E), west (W), NNE, NNW, etc.) in which the window is facing.

Upon entry into premises 260, client determination unit 410 may determine the positions of client device 140 based on measured signal characteristics of the wireless signals used for network communications, according to one embodiment. For example, position of client device 140 may be determined by measuring time delays and/or signal strengths associated with packets that are wirelessly transmitted and received. In other embodiments, position data of client device 140 obtained from different sources, such as inertial sensors on-board client device 140, may be combined to improve accuracy of the tracked movement of client device 140. For example, client determination unit 410 may use gyroscope data and/or accelerometer data measurements, etc., to perform dead reckoning location tracking of client device 140 with respect to WAPs 110.

For example, client device 140's current position, orientation, and/or velocity may be calculated relative to a previously determined position (e.g., the entry to premises 260), and advancing that position based upon known or estimated velocity vectors over elapsed time and course. Once positions of client device 140 are determined, client position determination unit 410 may also track the positions of client device 140 over time, and be able to dynamically determine, in real time or near real time, when client device 140 moves within premises 260, for example, from one signal coverage area to another and/or one room to another. Client location determination unit 410 may use data obtained from other on-board sensors, such as optical and/or magnetic sensors for error-correction in the dead reckoning process.

WLAN profile determination unit 420 may be configured to determine WAP coverage areas within WLAN 200 and then define coverage areas associated with each WAP 110. WLAN profile determination unit 420 may monitor, for example, 2.4 Gigahertz (GHz) and 5 GHz frequency bands based on the WiFi chipset capability of each client device 140. In one embodiment, client device 140 may monitor wireless network (e.g., WiFi) signal strength (e.g., received signal strength indication (RSSI)) associated with all WAPs 110 broadcasting a service set identifier (SSID) that identifies WLAN 200. WAPs may include, for example, all devices that appear on the RSSI scan list, for example, another client device 140. WLAN profile determination unit 420 may associate each of the RSSI values with a basic SSID (BSSID) corresponding to the MAC (media access control) address that uniquely identifies the signal source (i.e., WAP 110). WLAN profile determination unit 420 may record these values (e.g., RSSI, BSSID) and index the values with the positions at which the values were observed, using location information from client location determination unit 410. WLAN profile determination unit 420 may store this information to generate a WLAN signal profile that is indexed for premises 260.

Premises heatmap generator 430 may be configured to generate one or more heatmaps for premises 260 based on the WLAN signal profile provided by WLAN profile determination unit 420. In one embodiment, premises heatmap generator 430 may accumulate the WLAN signal profile data for one or more areas of premises 260 from one or more user devices 140 to identify trends with respect to outlines of paths taken by one or more users 145 within premises 260. In one embodiment, premises heatmap generator 430 may generate a heatmap for premises 260 that includes information identifying a layout (e.g., floorplan) of premises 260. In one embodiment, the heatmap may identify the relative locations of one or more rooms, walls, doorways, hallways, windows, appliances, etc. For example, premises heatmap generator 430 may analyze historical WLAN signal profiles to identify the location of common areas (e.g., breakroom, restrooms, kitchen, etc.) and/or offices of individuals based on the diversity of the identified traffic, timing of the identified traffic, etc., of client devices 140 observed in those areas. In some embodiments, premises heatmap generator 430 may generate individual heatmaps for each WAP 110, and then overlay the individual heatmaps to form one overall layout of premises 260.

Premises heatmap generator 430, in one embodiment, may determine an accuracy and/or precision of the heatmap for premises 260 based on the quantity and/or the quality of the WLAN signal profile data used to generate the heatmap. Premises heatmap generator 430 may determine whether the accuracy and/or precision is greater than a threshold that is set for the accuracy and/or the precision. When premises heatmap generator 430 determines that the threshold is not met, the heatmap for premises 260 may not be provided to client device 140. When premises heatmap generator 430 determines that the threshold is met or exceeded, the heatmap for premises 260 may be pushed to client device 140 and/or provided upon request. The heatmap may take any form, including a data file of any format, such as a graphical image that may be displayed via a display on client device 140 for viewing by user 145.

WAP quality monitoring unit 440 may monitor performance for each of WAP 110 corresponding to a day and a time of day. For example, WAP quality monitoring unit 440 may measure one or more of throughput, jitter, delay, etc., for each WAP 110 (e.g., signals transmitted and/or received by each WAP 110). In one embodiment, WAP quality monitoring unit 440 may assign a score to each WAP 110 based on the monitored performance. WAP quality monitoring unit 440 may store the scores in a database that stores historical data concerning the "health" of each WAP 110, for example, with respect to reliability. In one embodiment, network controller 230 may use the performance quality scores in performing connection management for user devices 140 with respect to WLAN 200.

Although FIG. 4 shows exemplary functional components of client device 140 and/or heatmapping system 130, in other implementations, client device 140 and/or heatmapping system 130 may contain fewer, different, differently arranged, or additional functional components than depicted in FIG. 4. In still other implementations, a functional component of client device 140 and/or heatmapping system 130 may perform one or more tasks described as being performed by another functional component of client device 140 and/or heatmapping system 130.

Figure 5:
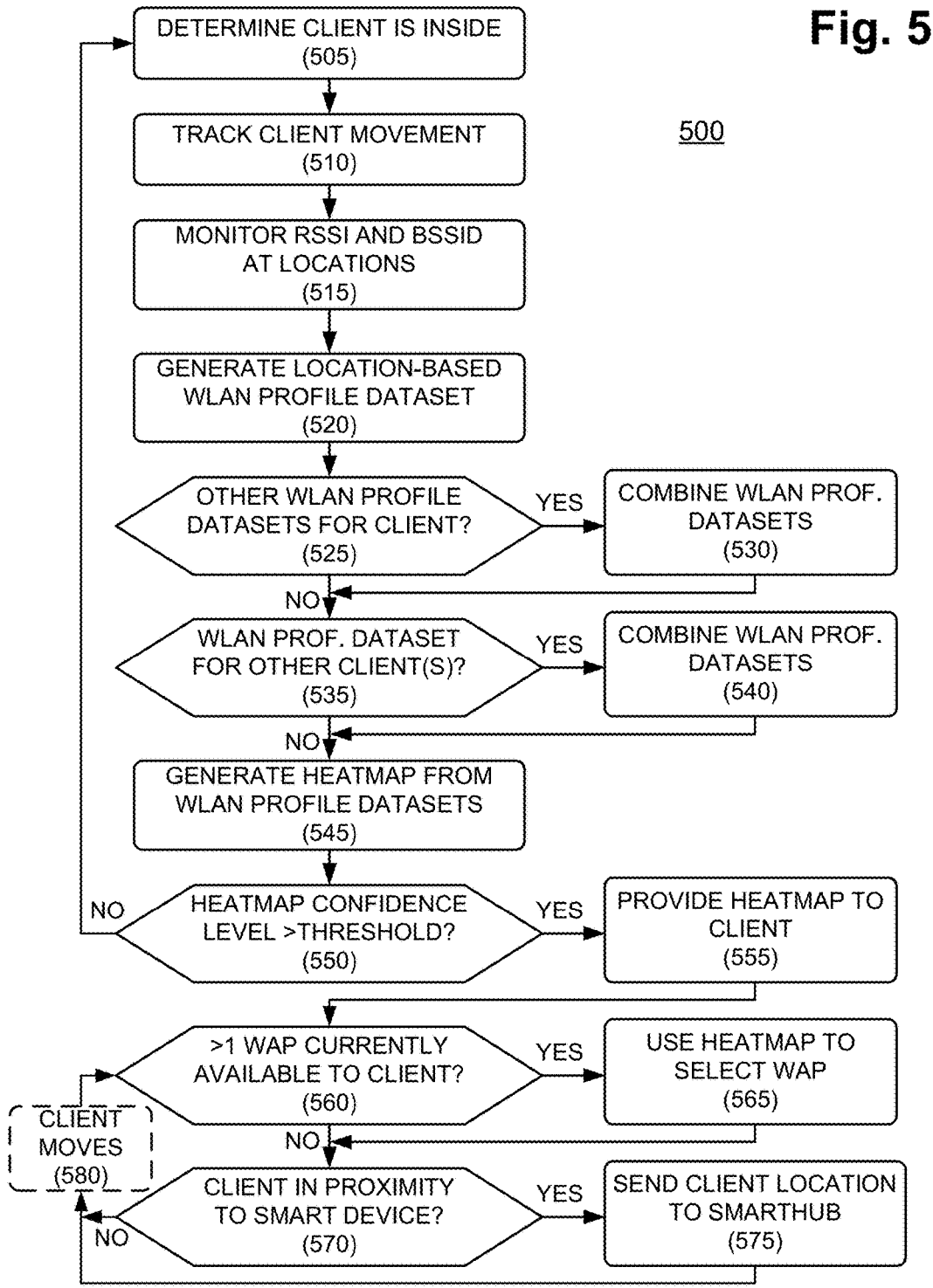
FIG. 5 is a flow diagram of an exemplary process associated with wireless network heatmapping.

FIG. 5 is a flow diagram of an exemplary process 500 for wireless network heatmapping. Process 500 may be performed by client device 140 and/or network controller 230, for example, by executing instructions on processor 320 which may be stored in memory 330. For ease of explanation, process 500 is described below in relation to operations associated with a single exemplary client device 140. However, it should be noted that process 500 may be performed in association with any number of client devices 140, including all client devices 140 operating in WLAN 200, or any subset thereof, depending upon the configuration of network controller 230 and/or client device 140.

Initially, client location determination unit 410 may determine a location of client device 140 relative to a geographic premises. For example, client location determination unit 410 may determine, from global positioning system (GPS) signals received at client device 140, that client device 140 is in the proximity of a building structure at a location corresponding to certain Cartesian and/or geographical (e.g., geographic information system (GIS) coordinates and/or a physical address associated with the GPS data received at client device 140. Process 500 may include client location determination unit 410 determining that client device 140 has entered premises 260 (Block 505). In one embodiment, client location determination unit 410 may detect the loss of one or more of the GPS signals received at client device 140 and determine that the received GPS data is insufficient to accurately locate client device 140 using GPS. Based on the detection of the loss of the GPS signal, client location determination unit 410 may determine that client device 140 is inside premises 260.

The determination that client device 140 is located in premises 260 may trigger client location determination unit 410 to initiate a tracking mode with respect to movement of client device 140 within premises 260 (Block 510). In one embodiment, client location determination unit 410 may use sensor information automatically obtained from inertial sensors associated with client device 140 to perform, for example, dead reckoning location tracking of client device 140, relative to a reliable (i.e., last-known) geographic location (e.g., an exterior door) to determine the location of client device 140 within premises 260. The sensor information may include, for example, inertial measurement data obtained from a gyroscope, an accelerometer, a Bluetooth®-enabled transceiver, and/or any other sensor device, such as a camera and/or magnetic sensor, available to client device 140. As discussed above, limited GPS data may be used to locate client device 140 near a window in premises 260. The positions of client device 140 may be determined using any number of device-locating techniques.

Data analytics may be performed on any of the sensor data and any number of times, for example, using one or more models to account for anomalies (vibrations, random movements of user's hand, transients such as dropping of client device 140). Client location determination unit 410 may use the tracking data, including time-of-day and/or day-of-week information, to determine a path traversed by client device 140 over a given time period. Client location determination unit 410 may store, for example, the (raw) tracking data and/or the path determination data. Client location determination unit 410 may determine when client device 140 exits premises 260, either through the entry point or another portal, for example, when the GPS signals are again received at client device 140.

While client location determination unit 410 tracks the movement of client device 140 within premises 260, WLAN profile determination unit 420 may monitor wireless network (e.g., WiFi) access point (AP) signal strength (e.g., received signal strength indication (RSSI)) for all devices (i.e., signal source) broadcasting an identifier (e.g., SSID) associated with the wireless network (Block 515). WLAN profile determination unit 420 may record the RSSI values, for example, with an associated timestamp and the BSSID (i.e., media access control (MAC) address) that identifies WAP 110. WLAN profile determination unit 420 may record and/or index one or more of the RSSI values, SSID, BSSID and/or timestamp information with location information identifying one or more positions of client device 140 along the traversed path within premises 260, to generate a wireless network (e.g., WLAN) profile dataset (Block 520).

Process 500 may include premises heatmap generator 430 determining whether one or more other wireless network profile datasets associated with client device 140 for the premises have been generated (Block 525). In one embodiment, premises heatmap generator 430 may generate a query message, for example, using an identifier for premises 260 (e.g., street address, venue name, etc.) to retrieve one or more stored WLAN profile datasets previously generated by client device 140 with respect to premises 260. When one or more datasets are returned responsive to the query (Block 525 Yes), premises heatmap generator 430 may combine the datasets to form a single dataset (Block 530). In one embodiment, comparisons of the datasets may identify data congruency in some respects and incongruency in other respects concerning the layout of premises 260. Premises heatmap generator 430 may reconcile one or more of the incongruencies using statistical analyses.

When no other datasets are returned responsive to the query (Block 525 No), or upon combination of the datasets (Block 530), process 500 may include premises heatmap generator 430 determining whether one or more other wireless network profile datasets associated with one or more client device 140 other than client device 140 for premises 260 have been generated (Block 535). In one embodiment, premises heatmap generator 430 may generate a query message using, for example, an identifier for premises 260 (e.g., street address, venue name, etc.) to retrieve one or more stored WLAN profile datasets previously generated by one or more client device 140 other than client device 140 with respect to premises 260. When one or more datasets are returned responsive to the query (Block 535 YES), premises heatmap generator 430 may combine the datasets to form a single, composite dataset (Block 540). In some embodiments, the operations described in Blocks 525, 530, 535, and 540 may be performed in parallel and/or as a single operation.

In one embodiment, process 500 may proceed with premises heatmap generator 430 generating a heatmap of premises 260 from the wireless network profile dataset and/or the combination of network profile datasets (Block 545). When a heatmap of premises 260 already exists, the operation of Block 545 may include updating the existing heatmap of premises 260 to include the additional data from the dataset (s). The heatmap of premises 260 may include WAP signal strength values and floor layout information for a number of identified positions of throughout portions of premises 260. For one or more of the identified positions, the WAP signal values may be sourced to multiple WAPs 110. For one or more of the identified positions the floor layout identifies one or more floor levels, rooms, doorways, windows, appliances, furniture, exterior doors, and/or other structural reference points.

In some embodiments, process 500 may include premises heatmap generator 430 determining whether a confidence level of the accuracy of the heatmap exceeds an applicable threshold (Block 550). For example, the confidence threshold level may be based on a determined precision (e.g., level of detail) of the floor layout of the premises. Premises heatmap generator 430 may determine whether the accumulated data for premises 260, or a portion of premises 260 (e.g., a floor, suite, etc.), is sufficient to identify a definitive trend with respect to wireless network coverage areas within premises 260. When premises heatmap generator 430 determines that a confidence level of the accuracy of the heatmap meets or exceeds an applicable threshold (Block 545 YES), premises heatmap generator 430 may provide the heatmap to client device 140 (Block 555). In one embodiment, premises heatmap generator 430 may provide one or more schematics of varying detail that outline one or more paths within premises 260 and/or define a shape of the interior of premises 260. When premises heatmap generator 430 determines that the confidence level of the accuracy of the heatmap does not meet or exceed the applicable threshold (Block 545 NO), premises heatmap generator 430 may return to Block 505, or to any other previous operation of process 500.

Once heatmap data is generated by premises heatmap generator 430, premises heatmap generator 430 may apply at least a portion of the heatmap data to a determination of whether client device 140 is currently located in more than one wireless network access coverage area sourced by multiple WAPs 110 (Block 560). When premises heatmap generator 430 determines that client device 140 is in a region of premises 260 that is served by more than one WAP 110 (Block 560 YES), premises heatmap generator 430 may use the heatmap data to select WAP 110, from among available WAPs 110, for connection (Block 565). For example, premises heatmap generator 430 may use RSSI information for each broadcasting WAP 110 to select which WAP 110 to connect to, which may cause premises heatmap generator 430 to implement a handover process to establish a connection with the selected WAP 110. In one embodiment, premises heatmap generator 430 may execute a connection management application resident on client device 140 to override, if necessary, an existing connection manager associated with client device 140 and/or network controller 230 that is not configured to use heatmap data in controlling network connections for client device 140.

When either only one WAP 110 is determined to be available to client device 140 (Block 560 N))) or WAP 110 has been selected among multiple available WAPs 110 (Block 565), premises heatmap generator 430 may use the heatmap data to determine whether client device 140 is in proximity to one or more network appliances 120 in premises 260 (Block 570). For example, premises heatmap generator 430 may determine, using location information from the heatmap data, whether any network appliance 120 is in a room where client device 140 is currently located and for which client device 140 has preferred settings. Based on a determination that network device 120 is in a same area as client device 140 (Block 570 YES), premises heatmap generator 430 may send location information for client device 140 to network controller 230 that may in turn send control information to one or more network appliances 120 for which the user's preferences correspond to a setting change (Block 575). Network appliance 120 may then make the appropriate setting change.

When either client device 140 is not in proximity to network appliance 120 (Block 570 NO) or location information has been sent to network controller 230 (Block 575), client location determination unit 410 may track the movement of client device 140 (Block 570), and the process for determining whether more than one WAP 110 is available to client device 140 may be repeated (Block 560).

Figure 6:
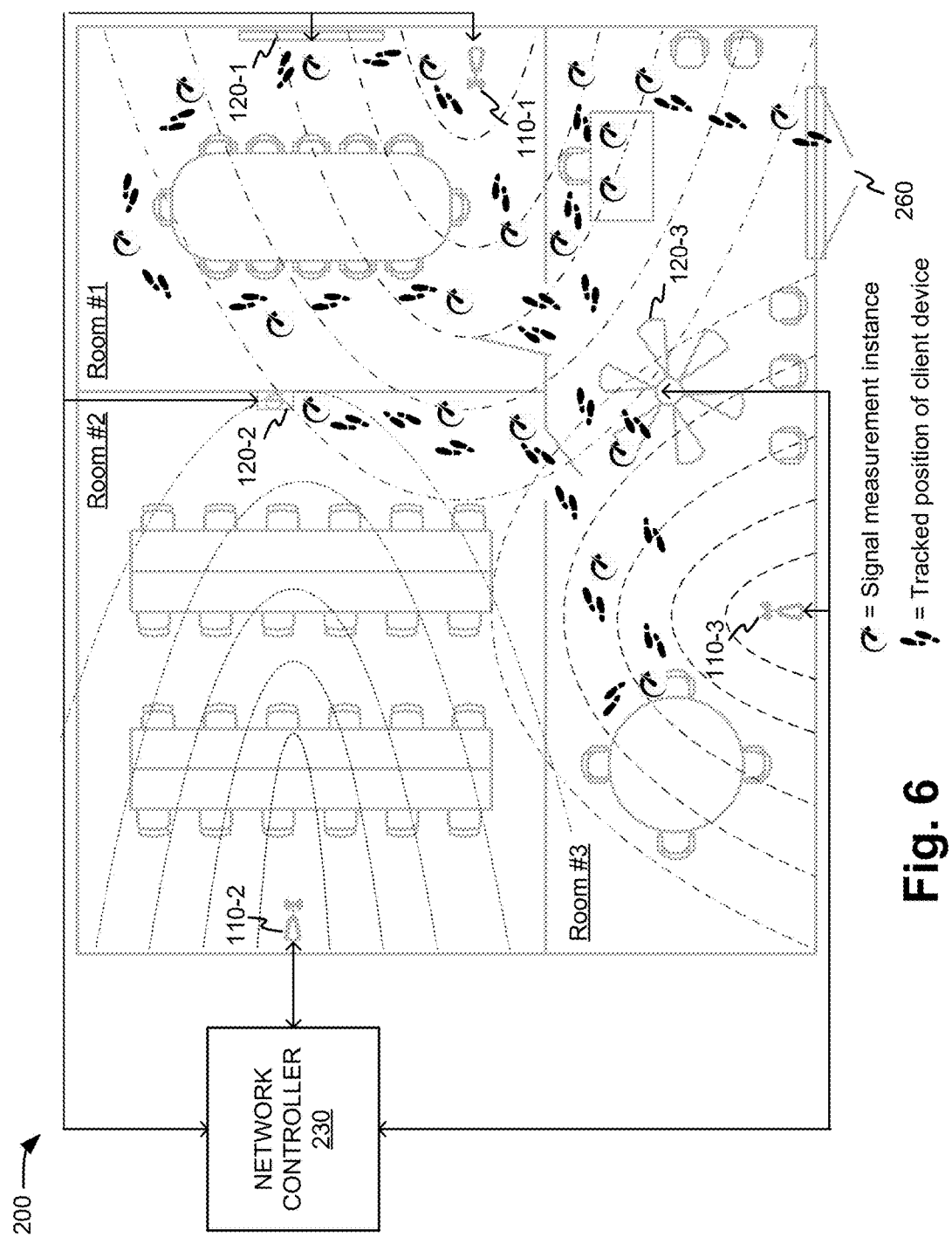
FIG. 6 is a diagram illustrating an exemplary technique for determining a position of a client in the premises shown in FIG. 2.

FIG. 6 is a diagram illustrating an exemplary technique for determining a position of an exemplary client device 140-1 in premises 260, previously shown in FIG. 2. Assume, for the example shown in FIG. 6, that client device 140-1 is carried by user 145-1 who is an administrative assistant who works in the suite corresponding to premises 260. The shoeprint icons (FIG. 6, tracked position of client device 140) shown may represent a number of positions of user 145-1 upon entering and walking through premises 260, for example, during the course of a workday, as determined by client location determination unit 410, for example. The meter gauge icons (FIG. 6, signal measurement instance) may represent instances of measurement of wireless network signals (e.g., RSSI) sourced by WAPs 110, as obtained by WLAN profile determination unit 420.

The location information corresponding to the shoeprints may be used to determine a path taken from the entrance to premises 260 to a desk and chair used by user 145-1 in Room #3. The location information may further identify user 145-1's path around the conference table in Room #1, consistent with user 145-1 straightening the chairs around the conference table and adjusting window covering 120-1, for example. As discussed above, client device 140 may receive a GPS signal from one or more GPS satellites through the window associated with window covering 120-1, sufficient to locate the window relative to an exterior wall of premises 260. The location information may further identify user 145-1's path to a table in Room #3, consistent with user 145-1 placing a newspaper on the table, for example. The location information may further identify user 145-1's path to Room #2, consistent with user 145-1 adjusting thermostat 120-2, for example, followed by user 145-1 returning to the desk in Room #3. While the technique illustrated in FIG. 6 only shows client device 140-1's movements over a short time period, additional data points (i.e., position, signal strengths, etc.) may be obtained over the course of the workday for user 145-1 within premises 260. WLAN profile determination unit 420 may use the data obtained from client device 140 in the preceding process to generate and store a WLAN profile for WAPs 110 within premises 260 with respect to WLAN 200.

Figure 7:
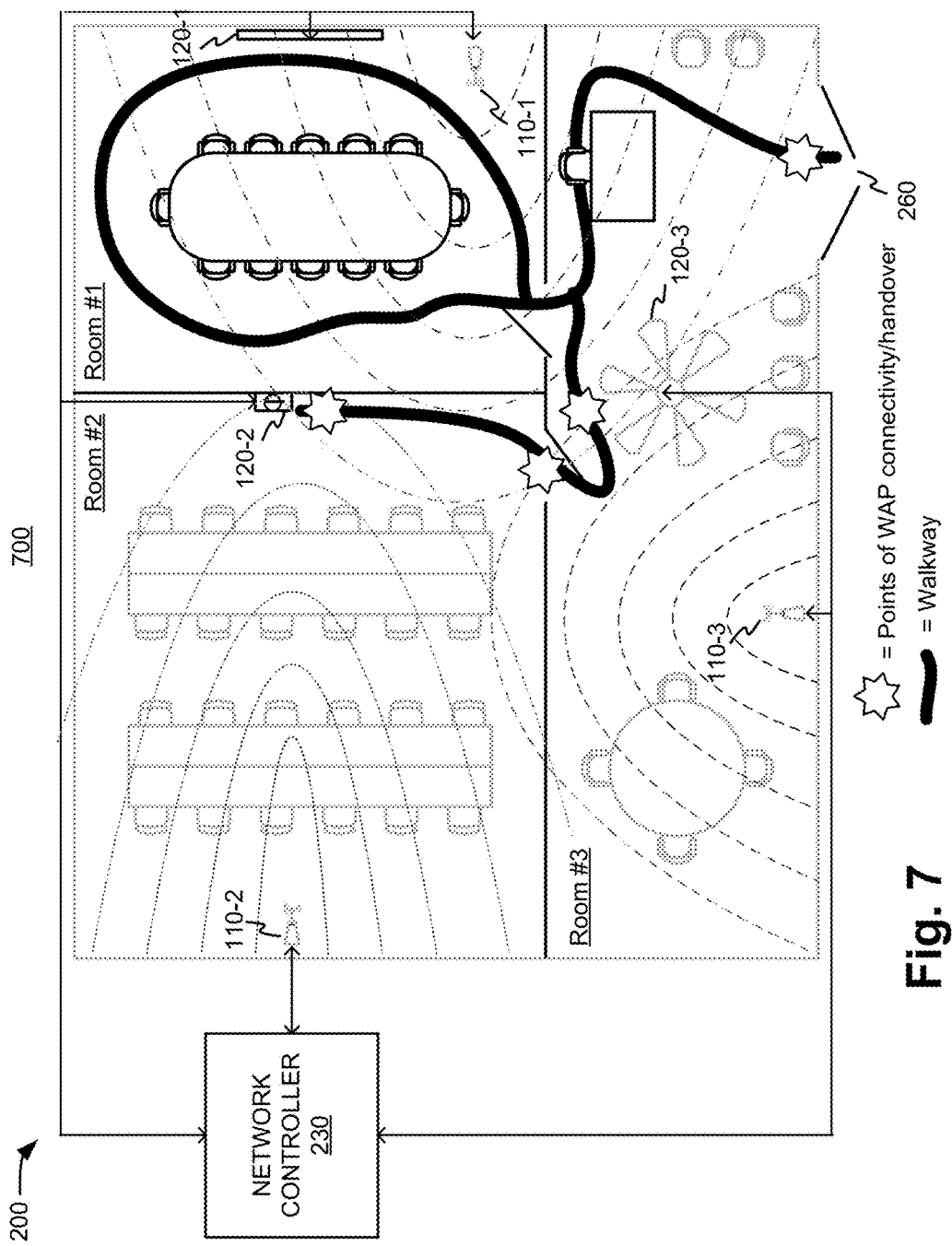
FIG. 7 is a diagram illustrating an exemplary heatmap for the premises shown in FIG. 2.

FIG. 7 is a diagram illustrating an exemplary heatmap 700 generated using the WLAN profile generated in FIG. 6. For example, the location data and the signal strength data may be used to derive various portions of premises 260, relative to a walkway denoted by a solid black line and to points of WAP connectivity/handover denoted by stars along the walkway. For example, premises heatmap generator 430 may analyze the WLAN profile to generally identify the location of one or more of the inner walls and doorways that separate Rooms #1-3, the location and/or shape of desk/chair in Room #1, the location and/or shape of the conference table and window covering 120-1 in Room #1, and/or the location of thermostat 120-1 in Room #2. Alternatively, the location data and the signal strength data may be insufficient to identify one or more of the exterior walls of premises 260, the chairs, ceiling fan and/or table and chairs in Room #3, and/or the furniture in Room #2, as represented by the grayscale depiction of those features in FIG. 7.

Figure 8:
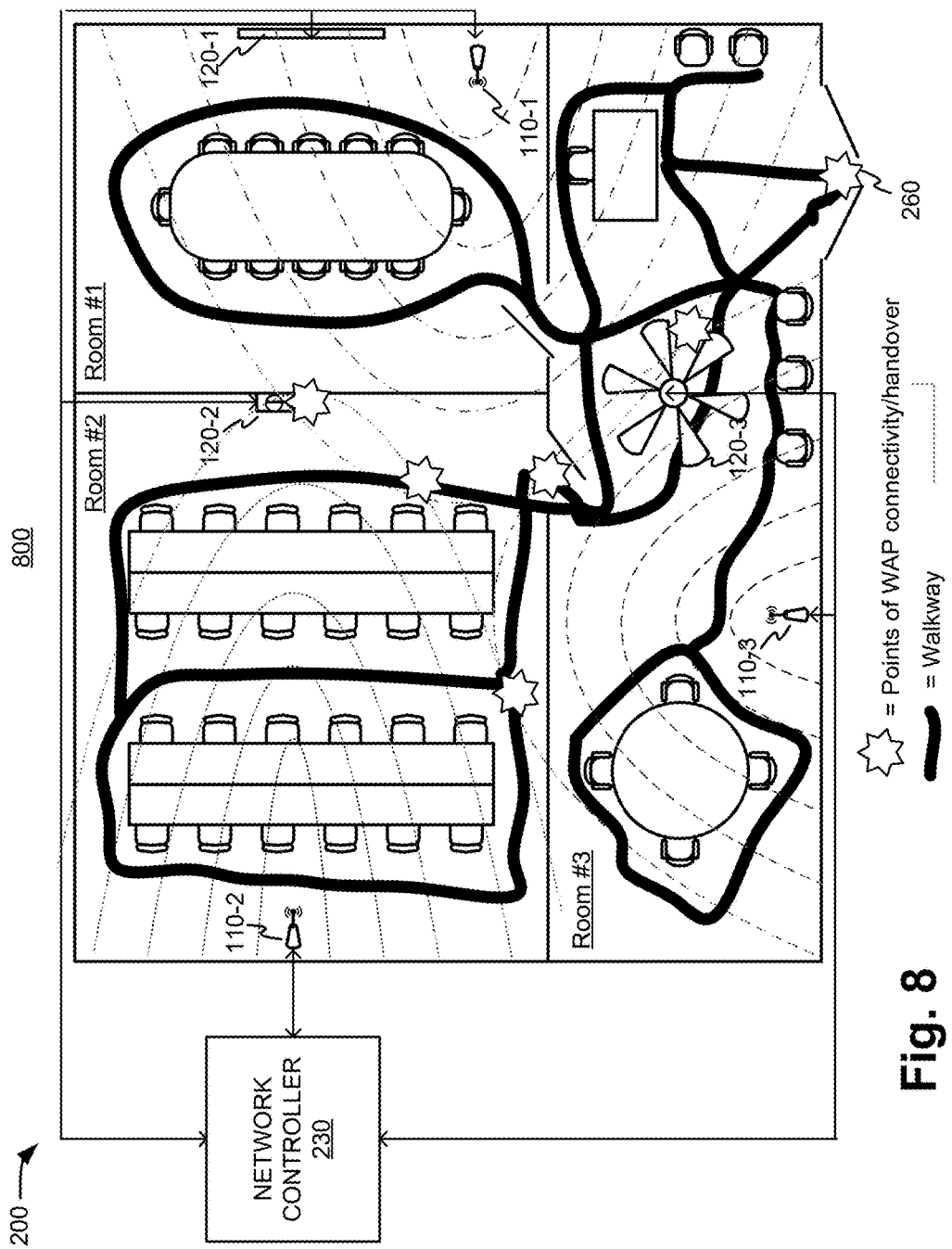
FIG. 8 is a diagram showing exemplary composite heatmap that incorporates the heatmap shown in FIG. 7 consistent with an embodiment presented herein.

As discussed above, premises heatmap generator 430 may determine that heatmap 700 is lacking sufficient detail (e.g., room dimensions, etc.) with respect to premises 260 relative to a threshold confidence level. Based on this determination, premises heatmap generator 430 may not make heatmap 700 available to user 145-1 or other users 145. FIG. 8 is a diagram illustrating an exemplary heatmap 800 generated using heatmap 700, which has been overlaid with one or more other heatmaps generated for premises 260. For example, premises heatmap generator 430 may generate a composite of cumulative heatmaps for premises 260 that is determined to meet a confidence level threshold concerning the physical layout of the interior of premises 260, for example, with respect to WAPs 110-1, 110-2, 110-3. For example, walkways are denoted by a solid black line and points of WAP connectivity/handover are denoted by star-shaped icons along the walkway. Heatmap 800 may then be provided to client device 140, heatmapping system 130, and/or network controller 230.

In one embodiment, heatmap 800 may be used by client device 140, heatmapping system 130, and/or network controller 230 to govern WLAN 200 connectivity for client devices 140 operated by users 145 in premises 260. Initially, for example, client device 140-1 may connect to WAP 110-1 upon entering premises 260. If user 145-1 walks straight toward the reception desk or Room #1, client device may remain connected to WAP 110-1. If, on the other hand, user 145-1 walks toward the ceiling fan in Room #3, network controller 230 may instruct client device 140-1 (e.g., via a connection management application resident on client device 140) to perform a handover to WAP 110-3. Similarly, if user 145-1 enters Room #2, network controller 230 may send a recommendation to client device 140-1 to perform one of a number of potential handovers within Room #2 depending on where user 145-1 goes.

In one embodiment, network controller 230 may recommend handovers based on the scores generated and stored by WAP quality monitoring unit 440 for WAPs 110-1, 110-2, and 110-3. Accordingly, handovers may be recommended for client device 140 even from a source having a higher signal strength to a source having a lower signal strength for a particular location within premises 260, based on other factors (e.g., historical reliability data, scores associated with WAPs 110, direction of movement for client device 140. In this manner, intelligent connection management may be achieved at a current position of client device 140 within premises 260, based on a preceding and/or a succeeding (i.e., predicted or projected) position of client device 140. Whereas, conventional connection management rules may maintain a current connection with a WAP 110 despite a declining signal strength and the availability of a superior signal sourced by another WAP 110. In one embodiment, the recommended connectivity rules may differ from a second set of connectivity rules on an application of client device 140 and/network controller 230, for example. In some embodiments, the recommended set of connectivity rules may override or supersede the conventional set of connectivity rules.

In another embodiment, the heatmap may be used by client device 140, heatmapping system 130, and/or network controller 230 to control network appliances 110-1, 110-2, 110-3, for example, based on a proximity of client device 140-1, as well as user 145-1's preferences for operation settings for network appliances 120-1, 120-2, 120-3. For example, location information concerning client device 140-1 may be sent to a smarthub device (e.g., network controller 230) to network appliances 120. In this manner, network appliances 120 do not need sensors and/or software for sensing a presence of user 145-1 to trigger automation. In addition, triggering activation/deactivation, adjustments, etc., may be customized to user 145, as opposed to triggering solely based on the proximity of a person—without regard to the particular person—to network appliances 120.

In other embodiments, the heatmap information may be generated in and used for locating client devices in public venues such as sports arenas, shopping malls, airports, for triggering location-based operations based on the location of the client devices. For example, in addition to step-by-step directions, seating information may be provided to user devices in a sports arena, store-specific advertisements may be provided to user devices in a shopping mall, gate and/or flight information may be provided to user devices at airports. To the extent that layout information is publicly available for the public venues, such information may be combined with the heatmap data generated by users. In other embodiments, the heatmap information may be generated in and used for locating client devices in private dwellings in which multiple WAPs (e.g., WiFi routers) are deployed in a WLAN architecture.

The embodiments described herein allow mobile devices to dynamically assess immediate WiFi environments over time without requiring any site surveys, add-on software, applications, etc. As a result, mobile devices may automatically maintain the best quality WiFi connection without requiring user interaction and thus functions such as VoIP calling that require reliable network connections may be maintained. Further, home automation routines can be customized to be user-specific, so that different users may automatically adjust room temperatures, for instance, based on who is in the room, how many persons are in the room, etc.

Various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, while a series of operations has been described with respect to FIG. 5, the order of the operations may be modified in other implementations. Further, non-dependent operations may be performed in parallel.

It will be apparent that different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code. It being understood that software and control hardware can be designed to implement these aspects based on the description herein.

Further, certain portions of the invention may be implemented as a "component" or "system" that performs one or more functions. These components/systems may include hardware, such as a processor, an ASIC, a FPGA, or other processing logic, or a combination of hardware and software.

To the extent the aforementioned embodiments collect, store or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the invention unless explicitly described as such. Also, as used herein, the article "a" and "one of" is intended to include one or more items. Further, the phrase "based on" is intended to mean "based, at least in part, on" unless explicitly stated otherwise.

What is claimed is:
1. A method, comprising:
   determining, using first location data, that a client device is located in an interior of a premises in which multiple wireless network access points (APs) are deployed in a wireless network;
   identifying, using second location data, a plurality of locations of the client device within the interior of the premises;
   obtaining, for the plurality of locations, a dataset including wireless network signal strength values corresponding to signal coverage areas associated with the wireless network APs;
   generating, using the dataset, a wireless network mapping corresponding to a layout of the interior of the premises;
   determining that an accuracy level of the wireless network mapping meets a threshold level;
   providing, based on the determination regarding the accuracy level, the wireless network mapping to the client device;

evaluating, against a first set of connectivity rules that override a second set of connectivity rules that are not based on the wireless network mapping, the wireless network mapping with respect to at least two of the signal coverage areas that overlap, wherein the first set of connectivity rules define a set of operations for connecting the client device to the wireless network as a function of the plurality of locations; and applying, based on the evaluating, at least one of the operations to the client device at a current location of the client device relative to at least one of a preceding location or a succeeding location of the client device.

2. The method of claim 1, wherein the first location data comprises global positioning system (GPS) signals received at the client device, and wherein determining that the client device is located in the interior of the premises comprises:

detecting, relative to an entry point of the premises, signal loss at the client device associated with one or more of the GPS signals.

3. The method of claim 1, wherein identifying the second location data comprises:

identifying, using sensor information obtained from one or more inertial sensors associated with the client device, positional data for the client device to determine a path including the plurality of locations.

4. The method of claim 1, wherein obtaining the first dataset comprises:

recording scan list entries of received signal strength indication (RSSI) values for one or more of the wireless network APs at each of the plurality of locations at an identified time of day.

5. The method of claim 4, wherein generating the wireless network mapping comprises:

indexing RSSI values and basic service set identifiers (BSSIDs) broadcasted by the one or more wireless network APs for each of the plurality of locations.

6. The method of claim 1, wherein generating the wireless network mapping comprises:

identifying a location of at least one of a floor level, a room, a hallway, a window, or a doorway relative to one or more of the wireless network APs.

7. The method of claim 1, further comprising:

transmitting a proximity of the client device to a networked smart device; and triggering a premises automation system based on the proximity of the networked smart device according to a customized setting associated with the client device.

8. A device, comprising:

a communication interface;

a memory to store instructions; and a processor, coupled to the memory and the communication interface, to execute the instructions to:

determine, using first location data, that a client device is located in an interior of a premises in which multiple wireless network access points (APs) are deployed in a wireless network;

identify, using second location data, a plurality of locations of the client device within the interior of the premises;

obtain, for the plurality of locations, a dataset including wireless network signal strength values corresponding to signal coverage areas associated with the wireless network APs;

generate, using the dataset, a wireless network mapping corresponding to a layout of the interior of the premises;

determine that an accuracy level of the wireless network mapping meets a threshold level;

provide, based on the determination regarding the accuracy level, the wireless network mapping to the client device;

evaluate, against a first set of connectivity rules that override a second set of connectivity rules that are not based on the wireless network mapping, the wireless network mapping with respect to at least two of the signal coverage areas that overlap, wherein the first set of connectivity rules define a set of operations for connecting the client device to the wireless network as a function of the plurality of locations; and apply, based on the evaluating, at least one of the operations to the client device at a current location of the client device relative to at least one of a preceding location or a succeeding location of the client device.

9. The device of claim 8, wherein the first location data comprises global positioning system (GPS) signals received at the client device, and wherein to determine that the client device is located in the interior of the premises, the processor further executes the instructions to:

detect, relative to an entry point of the premises, signal loss at the client device associated with one or more of the GPS signals.

10. The device of claim 8, wherein to identify the plurality of locations the processor further executes the instructions to:

identify, using sensor information obtained from one or more inertial sensors associated with the client device, positional data for the client device to determine a path including the plurality of locations.

11. The device of claim 8, wherein to obtain the dataset the processor further executes the instructions to:

record scan list entries of received signal strength indication (RSSI) values for one or more of the wireless network APs at each of the plurality of locations at an identified time of day.

12. The device of claim 11, wherein to generate the wireless network mapping the processor further executes the instructions to:

index the RSSI values and basic service set identifiers (BSSIDs) broadcasted by the one or more wireless network APs for each of the plurality of locations.

13. The device of claim 8, wherein the processor further executes the instructions to:

identify a location of at least one of a floor level, room, a hallway, a window, or a doorway relative to the layout of the interior.

14. The device of claim 8, wherein the processor further executes the instructions to:

transmit a proximity of the client device to a networked smart appliance; and trigger a premises automation system based on the proximity of the networked smart appliance according to a customized setting associated with the client device.

15. A non-transitory computer-readable medium storing instructions which, when executed by a processor of a device, cause the device to:

determine, using first location data, that a client device is located in an interior of a premises in which multiple wireless network access points (APs) are deployed in a wireless network;

identify, using second location data, a plurality of locations of the client device within the interior of the premises;

obtain, for the plurality of locations, a dataset including wireless network signal strength values corresponding to signal coverage areas associated with the wireless network APs;

generate, using the dataset, a wireless network mapping corresponding to a layout of the interior of the premises;

determine that an accuracy level of the wireless network mapping meets a threshold level;

provide, based on the determination regarding the accuracy level, the wireless network mapping to the client device;

evaluate, against a first set of connectivity rules that override a second set of connectivity rules that are not based on the wireless network mapping, the wireless network mapping with respect to at least two of the signal coverage areas that overlap, wherein the first set of connectivity rules define a set of operations for connecting the client device to the wireless network as a function of the plurality of locations; and apply, based on the evaluating, at least one of the operations to the client device at a current location of the client device relative to at least one of a preceding location or a succeeding location of the client device.

16. The non-transitory computer-readable medium of claim 15, wherein to identify the plurality of locations the instructions further cause the device to:

identify, using sensor information obtained from one or more inertial sensors associated with the client device, positional data for the client device to determine a path including the plurality of locations.

17. The non-transitory computer-readable medium of claim 15, wherein to obtain the dataset the instructions further cause the device to:

record scan list entries of received signal strength indication (RSSI) values for one or more of the wireless network APs at each of the plurality of locations at an identified time of day.

18. The non-transitory computer-readable medium of claim 17, wherein to generate the wireless network mapping the instructions further cause the device to:

index the RSSI values and basic service set identifiers (BSSIDs) broadcasted by the one or more wireless network APs for each of the plurality of locations.

19. The non-transitory computer-readable medium of claim 15, wherein the instructions further cause the device to:

identify a location of at least one of a floor level, a room, a hallway, a window, or a doorway relative to the layout of the premises.

20. The non-transitory computer-readable medium of claim 15, wherein the instructions further cause the device to:

transmit, via the wireless network, a proximity of the client device to a networked smart appliance; and trigger a premises automation system based on the proximity of the networked smart appliance according to a customized setting associated with the client device.

* * * * *